July 19, 1966 F. SOLOMON ET AL 3,261,715
NEGATIVE ELECTRODE ASSEMBLY FOR ALKALINE BATTERIES
Filed Oct. 26, 1961 3 Sheets-Sheet 1

INVENTORS:
FRANK SOLOMON
ROBERT F. ENTERS
BY Irving Holtzman
ATTORNEY

July 19, 1966  F. SOLOMON ET AL  3,261,715
NEGATIVE ELECTRODE ASSEMBLY FOR ALKALINE BATTERIES
Filed Oct. 26, 1961  3 Sheets-Sheet 2

INVENTORS:
FRANK SOLOMON
ROBERT F. ENTERS
BY Irving Holtzman
ATTORNEY

July 19, 1966    F. SOLOMON ET AL    3,261,715

NEGATIVE ELECTRODE ASSEMBLY FOR ALKALINE BATTERIES

Filed Oct. 26, 1961    3 Sheets-Sheet 3

INVENTORS:
FRANK SOLOMON
ROBERT F. ENTERS
BY
Irving Holtzman
ATTORNEY

3,261,715
NEGATIVE ELECTRODE ASSEMBLY FOR ALKALINE BATTERIES
Frank Solomon, Lake Success, N.Y., and Robert F. Enters, Hackensack, N.J., assignors to Yardney International Corp., New York, N.Y., a corporation of New York
Filed Oct. 26, 1961, Ser. No. 147,778
6 Claims. (Cl. 136—50)

This invention relates to batteries of the alkaline type, e.g., dry-charged batteries, and, more particularly, to negative electrodes for such batteries. In electrodes of this character electrolyte is absent from the electrode assembly until activation by the addition of electrolyte, the plates of the assembly being in a charged state.

In alkaline batteries, particularly of the silver-zinc type, during cycling there is a reduction in the capacity of the battery due to a material loss in the zinc electrode. This occurs as a result of certain irreversible changes that come about during charging and discharging among which is the change in the shape of the zinc electrode. Moreover, zinc penetration of the separators is also a consequence of these processes which eventually causes a short circuit in the cell. The latter is believed to be due to the conversion of the zincate ion in the electrolyte of the separator to metallic zinc during the charging operation when sufficient zinc oxide is not otherwise available.

In an electrode assembly embodying the present invention the above difficulties are avoided by providing the zinc electrode with a reserve capacity of zinc in the discharged state, e.g., as zinc oxide. As a result of this arrangement there is made available excess zinc oxide only a fraction of which will be converted into metallic zinc on charging during any cycle. Losses in capacity and changes in shape which would ordinarily occur are avoided. Furthermore, zinc penetration and dendrite growth is reduced since excess zinc oxide is available for discharging which would ordinarily involve the conversion of zincate ion in the electrolyte present in the separator material.

In accordance with the present invention it has further been found that the performance of the negative metallic zinc electrode pasted with an excess of zinc oxide is further improved by including an electrically conductive grid, e.g., of copper or silver in the assembly. Particularly good results have been obtained from negative electrodes which contain a copper grid.

In providing the negative zinc-electrode assembly with excess zinc oxide it has been found that the zinc oxide often becomes mechanically dislodged from the electrode and the advantage of adding excess zinc oxide is consequently lost. Another aspect of the present invention provides a construction which avoids this difficulty.

It is accordingly a feature of the present invention that there is provided a negative electrode assembly for an alkaline-type battery, and particularly a zinc-electrode assembly for a dry-charged silver-zinc battery, having an excess of zinc oxide.

It is a further feature of the present invention that a negative electrode assembly, and particularly a zinc-electrode assembly, of the above-described type contains an electrically conductive grid.

It is also a feature of the present invention that there is provided a negative electrode assembly of the above-mentioned type wherein excess zinc oxide is firmly anchored in the negative electrode assembly.

Other and more detailed features of this invention will be apparent from the following description and the accompanying drawing wherein.

Since the present invention has particular application to silver-zinc batteries, the following description is directed to such a system by way of example.

Figure 1:
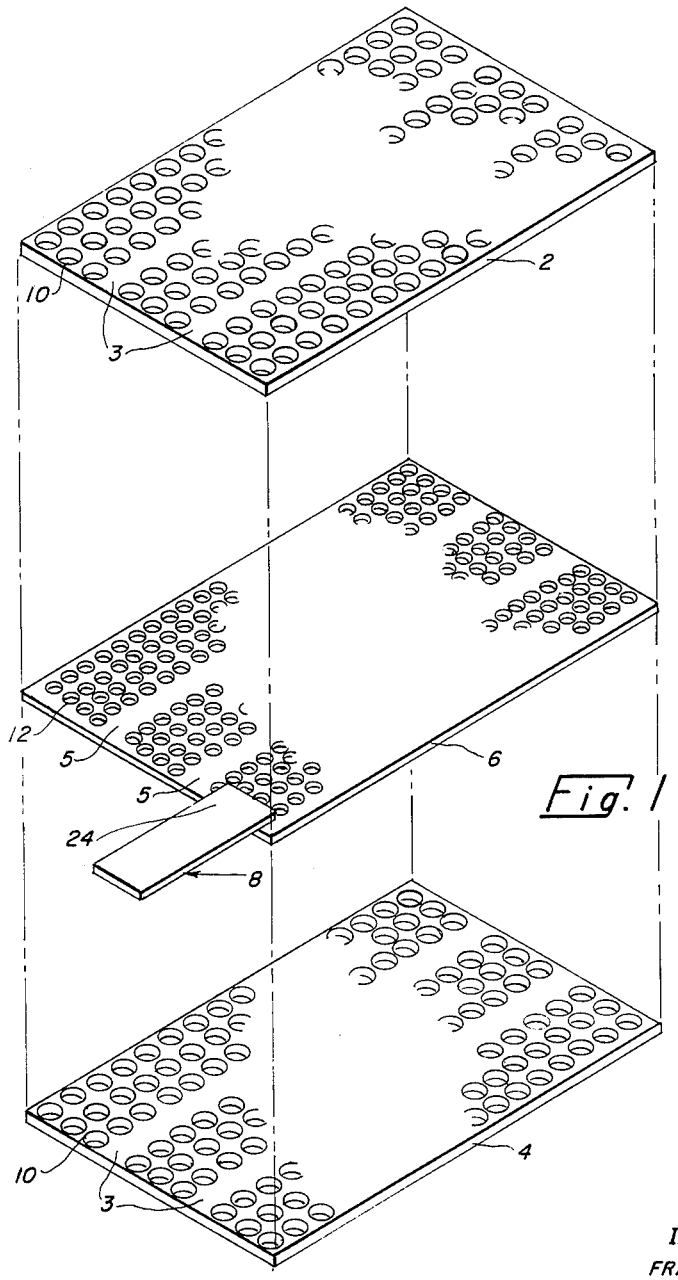
FIG. 1 is an exploded view of an electrode assembly embodying the present invention, the usual separators being removed to show the details of the plates and grid of the assembly.

As shown in FIG. 1, the metallic portions of the negative electrode assembly consists of an upper and a lower perforated zinc plate 2 and 4 and an intermediate perforated copper grid 6. Copper grid 6 is provided with a terminal tab 8 made of silver or other suitable conductive material. The tab 8 is secured to copper grid 6 by welding or other technique well known to those skilled in the art.

The perforations 10 provided in zinc plates 2 and 4 extend through the thickness of the plates and are generally of the same diameter in each zinc plate. The perforations 12 of the copper grid also extend through the thickness thereof but are smaller in diameter than those in the zinc plates.

The perforations in the zinc plates 2 and 4 and in copper grid 6 are distributed over the surface of the respective plates and the grid in groups of rows. There are thus formed areas of unperforated metal 3 in the zinc plates and corresponding areas of unperforated metal 5 in the copper grid. These unperforated areas serve to improve the electric conductivity of the respective member toward the terminal end of the electrode assembly.

The absolute size of the perforations in each of the plates and grid may vary considerably, depending on the characteristics desired in the electrode. In general, however, the diameter of the perforation in the zinc plate will be of the order of about .100 to .200 inch and preferably about .125 inch. The diameter of the perforations in the copper grid 6, as noted above, will be smaller than that of the holes in the zinc plates and will be of the order of .010 to about .090 inch, preferably about .063 inch. With regard to the relative sizes of the respective perforations, those in the zinc plate are of the order of three or four times the size of those in the copper grid.

The thickness of the copper grid and zinc plates 6 and 10, respectively, will also vary depending on the characteristics desired. They may be of the same thickness although each zinc plate is preferably slightly thicker than the copper grid. Thus the copper grid and the zinc plate may be of the order of .050 to .001 inch, and preferably in the range of .015 to .002 inch.

In assembling the zinc negative electrode, the copper grid 6 is sandwiched between the two zinc plates 2 and 4, and the three plate-shaped members are firmly secured together in any suitable fashion. In the preferred form of the invention they are hot forged at a temperature in the range of 500 to 600° F. The electrode assembly, after hot forging, is now in condition to be pasted with zinc oxide.

HgO may be included in the zinc-oxide paste used in the pasting operation and will consequently be picked up by the copper grid.

In assembling the zinc plates and the copper grid they are arranged so that the perforations are more or less concentrically arranged. When the plates and the grid are forged together, this arrangement forms a lock for the zinc-oxide paste as described more in detail below.

To complete the negative zinc electrode, a paste is made of water and zinc oxide which is applied to the forged assembly of zinc sheets and copper grid. In a preferred form of the invention, carboxymethyl cellulose is incorporated in the paste, for example, to the extent that it constitutes from .1% to 1% by weight of the final plate. The paste is then applied so that it penetrates through all of the perforations that are arranged approximately in a concentric fashion. When the paste dries and hardens, it forms dumbbell-like structures or plugs 14 which, as a result of the constricted neck 16, form a lock which prevents the dislodgment of the zinc oxide. The zinc oxide may also extend over the outside surfaces of the zinc plates 2 and 4 so as to form a thin skin. Upon subsequent charging, as noted above, part of this zinc oxide will be converted to metallic zinc.

The quantity of zinc oxide employed relative to the amount of metallic zinc present in the negative electrode will also vary depending on the requirements. In general, however, the negative electrodes will contain from ¼ to 1 part (preferably ½ part) of zinc oxide per part of metallic zinc.

Figure 2:
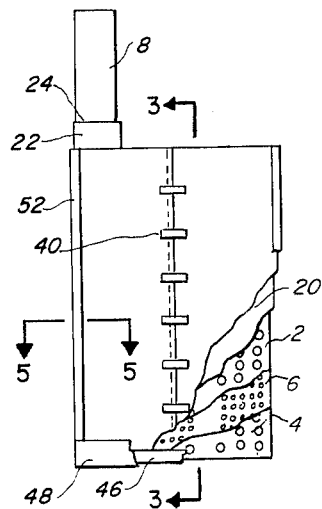
FIG. 2 is a front elevation of an electrode assembly as shown in FIG. 1, portions of the various layers being removed to show their relationships.
Figure 3:
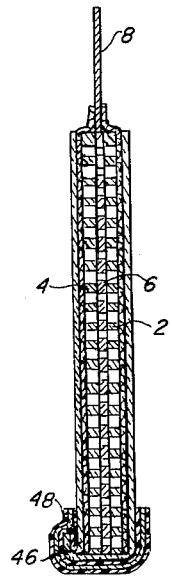
FIG. 3 is a cross-sectional view of the assembly shown in FIG. 2 taken along line 3—3 thereof.
Figure 5:
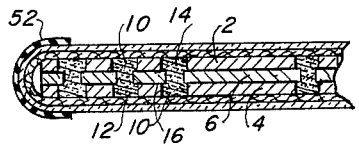
FIG. 5 is an enlarged cross-sectional view of the embodiment of this invention shown in FIG. 2, taken along line 5—5 thereof.

The zinc oxide-pasted negative electrode assembly may now be wrapped in appropriate separator materials. The preferred separator system is shown in FIGS. 2 to 4.

Figure 4:
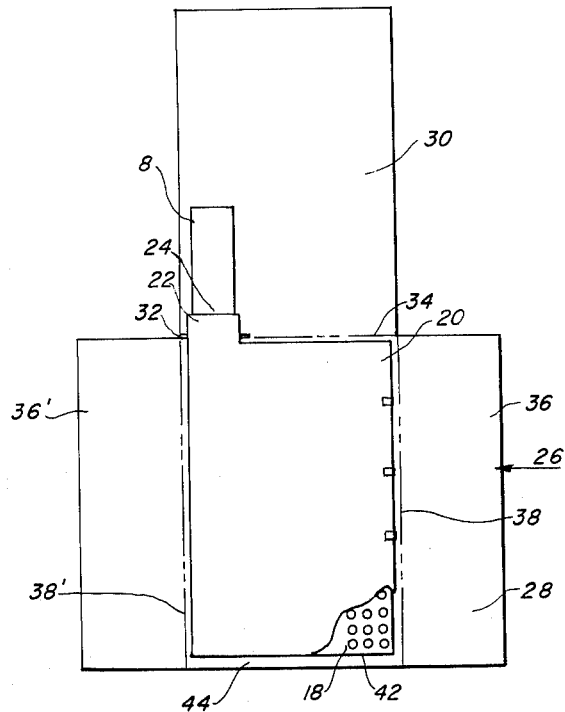
FIG. 4 is a front elevation of an electrode assembly according to the present invention, shown partly in section in which the manner of wrapping the separator materials around the electrode assembly is illustrated.

According to FIG. 4, the assembled and pasted negative electrode is first wrapped in about 1 to 3 turns of an inner separator sheet 20 provided with an extension 22 which is wrapped around the lower portion 24 of terminal tab 8. Inner separator sheet 20 may be made of a variety of porous materials through which the electrolyte readily passes and which inhibits zinc penetration. A variety of porous papers or modified papers may be used for this purpose. A particularly useful material is one sold under the tradename "Viskon." This is a silicone-treated non-woven rayon processed from viscose rayon fibers and a liquid cellulose binder.

The assembly is then wrapped in outer separator 26 shown in FIG. 4. This is in the form of a "T" comprising a cross bar or horizontal portion 28 and a vertical portion 30. A slit 32 spaced from the side of vertical portion 30 and extending for a short distance about along the line of the juncture of the vertical and horizontal portions of the "T" is provided so that the terminal tab 8 of the electrode assembly may be slipped through outer separator 26. Vertical portion 30 of the separator 26 is folded downwardly along fold line 34 to the edge of the electrode assembly 18. The lateral portions 36 and 36' of the cross bar 28 are then folded toward the midline of the electrode assembly 18 along fold lines 38 and 38', thus enclosing the electrode assembly and the inner separator 22. The outer separator 26 may be prevented from unfolding by pieces of tape 40.

As will be seen in FIG. 4, the outer separator 26 is positioned so that it extends below the lower edge 42 of the pasted electrode. This overhang 44 of outer separator 26 is rolled upwardly on one side of the electrode assembly to form a roll 46 as best seen in FIG. 3. A metallic clip 48, housed in an electrolyte-resistant plastic sleeve e.g. of polyethylene, is slipped over the rolled end 46 of the assembled and crimped and heat sealed to close the end of the separator. To further protect the lateral edges of the electrode assembly, a protective coating 52, preferably of a rubber-base coating, is applied along said edges and allowed to dry.

Figure 3A:
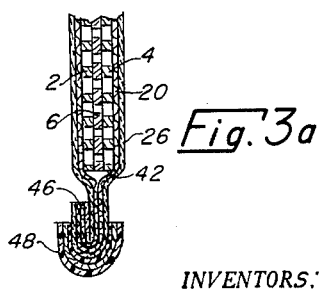
FIG. 3a is a view similar to that shown in FIG. 3 of another embodiment of this invention, illustrating a method of sealing the ends of a separator bag.

In the modification of the aforedescribed assembly illustrated in FIG. 3a, the inner and outer separator sheets 20 and 26 respectively are disposed so that there is a substantial overhang of material which extends below the lower edge 42 of the pasted electrode. This overhanging material is then folded or rolled back on itself to form a separator bag which is sealed in the same manner as described in connection with FIG. 3. In this case, however, the folded or rolled separator material is positioned below the plate rather than alongside the plate as shown in FIG. 3. This construction has an advantage in that the thickness of the electrode assembly is not increased.

The separator materials which may be used as the outer separator 26 of the present system may be any of a number of semi-permeable films used in the silver-zinc system. These include polyvinyl-alcohol film, regenerated-cellulose film, silver-cellulosate film, etc. The preferred material is a silver-cellulosate film made by treating cellulose with an aqueous solution of a silver salt as described in U. S. Patent 2,785,106.

The electrode assembly described above may be used in the construction of any of the silver/zinc batteries known in the prior art. In this system the electrolyte will be an alkaline electrolyte such as aqueous solution of KOH of about 10% to 45%, preferably about 44%. The silver electrode in this system may be of a variety of types. A suitable silver electrode is, for example, shown in U.S. Patent 2,818,462. Another silver electrode wherein a sintered silver sheet is hot forged onto each side of a silver grid may also be employed. The silver electrodes may be either unwrapped or wrapped with separators in a manner well known to those skilled in the art. A system similar to that used in wrapping the negative electrode described above may also be employed for the positive plates.

A particularly advantageous manner of employing the wrapped zinc negative assembly described above in a silver/zinc battery is to use it in conjunction with hot-forged sintered silver electrodes, as also described above, disposed in so-called "U"-shaped separators, as for example, described in U.S. Patents Nos. 2,594,710, 2,594,711 and 2,594,712 to H. André. In this case a positive electrode assembly is disposed in each arm of the "U" separator whereas the wrapped zinc negative assembly is disposed between the arms of the "U."

Figure 6:
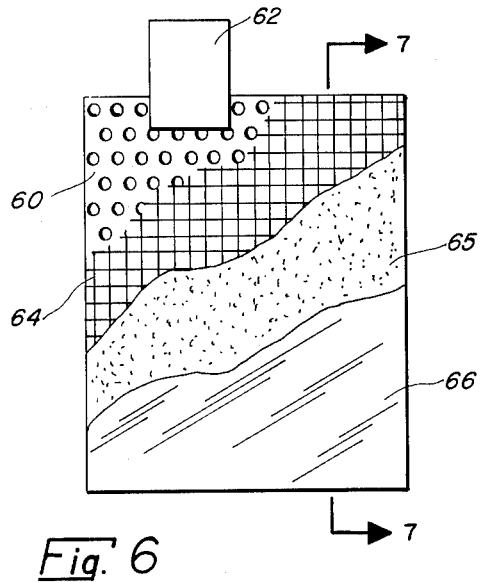
FIG. 6 is a front elevation of another embodiment of this invention, portions of the layers of the electrode being removed to show their relationship.
Figure 7:
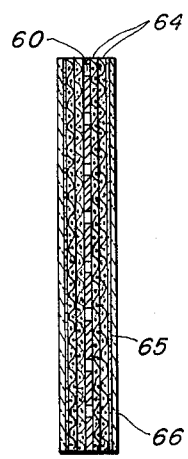
FIG. 7 is a cross-sectional view of FIG. 6, taken along line 7—7 thereof.

In FIGS. 6 and 7 a further electrode structure embodying the invention is shown after the application thereto of the separator material. In FIG. 6, 60 designates a perforated copper grid to which has been spot welded a silver tab 62. The size of the perforations and the relative dimensions of the copper grid will vary. In the embodiment shown, the copper grid was 4⅛" x 7" x .005".

A zinc screen 64 is then wrapped around the amalgamated copper grid 60. The number of layers of zinc mesh encompassing copper grid 60 will also vary. In the drawing, 2 layers of zinc screen are illustrated. In a preferred embodiment, 8 layers of zinc screen are employed. The dimensions of the zinc screen used may also vary. In the embodiment illustrated, zinc wire screen is used which has a mesh of 30 x 40 per square inch and a diameter of about .007".

Zinc oxide 65 is then pasted onto the zinc screen 64 so that it penetrates the openings thereof and also forms a thin skin overlying the screen. For this purpose a stiff paste of zinc oxide made with a ½% water solution of methylcellulose binder is employed. The pasted plate is then pressed to the desired thickness, e.g. .060", and allowed to air dry. In the preferred embodiment about 30 to 40 grams of ZnO is present in each plate. The total weight of zinc as zinc screen and zinc contained in the oxide is about 119 grams. On the average there will be about 92 grams of zinc as zinc screen in embodiments of this character. In the particular embodiment illustrated, there was present 33 grams of zinc oxide per plate and 92 grams of zinc per plate as zinc screen or mesh.

The negative zinc electrode illustrated in FIGS. 6 and 7 was used in an accumulator with a silver electrode containing about 101 grams of rolled porous silver. The silver electrode was wrapped in 1 turn of nylon and the zinc negative was wrapped in 1 turn of "Viskon" 66, described in more detail above. The electrolyte employed was a 44% aqueous solution of KOH. Other separator materials may also be used in conjunction with those already enumerated.

Figure 8:
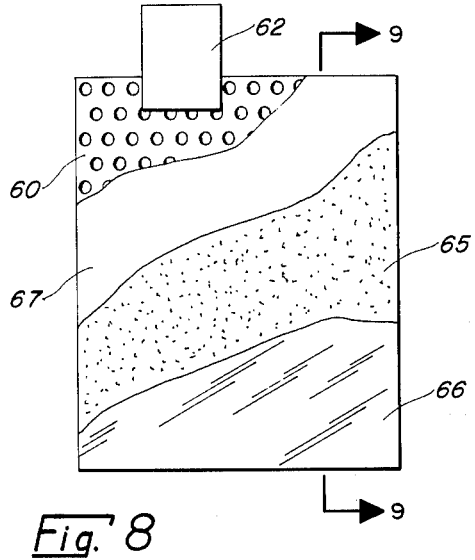
FIG. 8 is a front elevation of another embodiment of this invention similar to that shown in FIG. 6.
Figure 9:
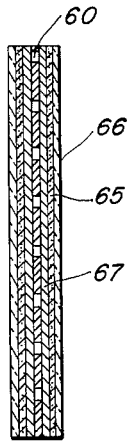
FIG. 9 is a cross-sectional view of the embodiment shown in FIG. 8, taken along line 9—9 thereof.

The embodiment of the invention illustrated in FIGS. 8 and 9 is similar to that shown in FIGS. 6 and 7. The only point of distinction is that, in place of zinc mesh or screen 64, this embodiment utilizes a zinc sheet 67. In the embodiment illustrated the total thickness of the negative plate was about .100" and the dimensions were 1⅞" x 5". Thirteen grams of zinc oxide was pasted in the form of a layer 65 on each side of the zinc sheet 67. The zinc sheet was .018" thick and 1 layer of zinc sheet was present on each side of the copper grid so that a total thickness of .036" of zinc sheet was used. This weighed about 38 grams. The perforated copper grid 60 of this embodiment had a thickness of .006". The zinc sheet and copper grid were amalgamated with 1% Hg. The ZnO contained 1% Hg.

This negative electrode was used to construct an accumulator using silver positive electrodes which contained about 30 grams of silver and were about .053" thick. The width and length of the silver plates were 1¹³⁄₁₆" x 5". The electrolyte used was 44% KOH and the separators employed were similar to those employed in the embodiment shown in FIGS. 6 and 7.

Whereas the invention has been described with reference to specific forms thereof, it will be understood that many changes and modifications may be made without departing from the spirit of this invention within the scope of the appended claims.

What is claimed is:

1. A negative electrode comprising an electrically conductive plate of a metal selected from the group which consists of copper and silver, said plate being provided with a multiplicity of perforations, a flat zinc structure overlying a face of said plate, said structure being formed with interstices larger than said perforations, and plugs of comminuted zinc at least partly in oxidized form occupying said perforations, said plugs extending into said interstices in intimate contact with said structure.

2. A negative electrode comprising an electrically conductive plate of a metal selected from the group which consists of copper and silver, said plate being provided with a multiplicity of perforations, a pair of flat zinc structures overlying opposite faces of said plate, said structures being formed with interstices larger than said perforations, and plugs of comminuted zinc at least partly in oxidized form occupying said perforations, said plugs extending into said interstices in intimate contact with said structures.

3. A negative electrode comprising a copper plate provided with a multiplicity of perforations, a flat zinc structure overlying a face of said plate, said structure being formed with interstices larger than said perforations, and plugs of comminuted zinc at least partly in oxidized form occupying said perforations, said plugs extending into said interstices in intimate contact with said structure.

4. A negative electrode comprising a copper plate provided with a multiplicity of perforations, a pair of flat zinc structures overlying opposite faces of said plate, said structures being formed with interstices larger than said perforations, and plugs of comminuted zinc at least partly in oxidized form occupying said perforations, said plugs extending into said interstices in intimate contact with said structures.

5. An electrode as defined in claim 4 wherein said zinc structures are in the form of perforated plates.

6. An electrode as defined in claim 4 wherein said zinc structures are in the form of wire screens.

References Cited by the Examiner

UNITED STATES PATENTS 2,987,567    6/1961    Freas et al. _____ 136—30

ALLEN B. CURTIS, *Primary Examiner.*

JOHN H. MACK, MURRAY A. TILLMAN, WINSTON A. DOUGLAS, *Examiners.*